Sept. 21, 1971     C. F. DANIELS ET AL     3,606,981

FAIRLEAD ASSEMBLY

Filed July 22, 1969

CURTICE F. DANIELS
CURTICE F. DANIELS, JR
*INVENTORS.*

BY
BUCKHORN, BLORE, KLARQUIST & SPARKMAN
ATTORNEYS

United States Patent Office 3,606,981
Patented Sept. 21, 1971

3,606,981
FAIRLEAD ASSEMBLY
Curtice F. Daniels, 305 Pacific, Glendale, Oreg. 97442,
and Curtice F. Daniels, Jr., 1311 NW. Hawthorne,
Grants Pass, Oreg. 97526
Filed July 22, 1969, Ser. No. 843,668
Int. Cl. B66d 1/36
U.S. Cl. 254—190                                          9 Claims

ABSTRACT OF THE DISCLOSURE

A fairlead assembly includes a guide sleeve and plural sheaves mounted for revolving movement about the axis of the sleeve. The sheaves are symmetrically arranged about a projection of the longitudinal axis of the sleeve with their rotational axes extending normal to the axis of the sleeve so that they converge to define a small central opening through which a cable leads towards a load. The invention includes crowned lines guides which extend between adjacent sheaves and have convexly curved outer surfaces. When a cable under tension extends across one of such surfaces, it tends to force the cable toward the closest sheave and revolve the sheave assembly to seat the cable in such sheave.

BACKGROUND OF THE INVENTION

Field of the invention

The present invention relates to a fairlead assembly for use in guiding a cable from a winch drum to a load, such as used in logging operations.

Description of the prior art

Many multiple sheave fairleads have been suggested for handling cables which in use might lead in various directions from the fairlead to the load. However, none so far have been completely satisfactory for handling cable which might lead in any direction throughout 360° without undue cable wear, stress on the fairlead, or fouling of the cable. Moreover, many of such prior fairleads have not been suitable for accommodating lines of different diameters.

SUMMARY OF THE INVENTION

The present invention is an improvement over the prior art in that it can handle cables of varying diameters with equal effectiveness regardless of the direction of lead. In accordance with the invention, crown lined guide surfaces extend between adjacent sheaves and act when the line is under tension and offlead to force the line into one of the plural sheaves or revolve the sheave assembly to align the line with a sheave.

Principal objects of the invention are to provide:

(1) A fairlead assembly capable of handling line leading in any direction throughout 360°;

(2) A fairlead assembly capable of handling effectively lines of different diameters;

(3) A fairlead assembly which will not foul the line regardless of the direction of lead of the line from the fairlead;

(4) A revolving-type fairlead assembly in which multiple sheaves are separated by crowned line-guiding surfaces which tend to force the line and revolve the assembly to align the line with a sheave when the line is offlead and under load;

(5) A fairlead assembly which will prolong the useful life of a cable; and (6) A fairlead assembly as aforesaid which is simple and economical to construct, operate and maintain.

BRIEF DESCRIPTION OF THE DRAWINGS

The foregoing and other objects and advantages of the present invention will become more apparent from the following detailed description which proceeds with reference to the accompanying drawing wherein.

DETAILED DESCRIPTION

Figure 5:
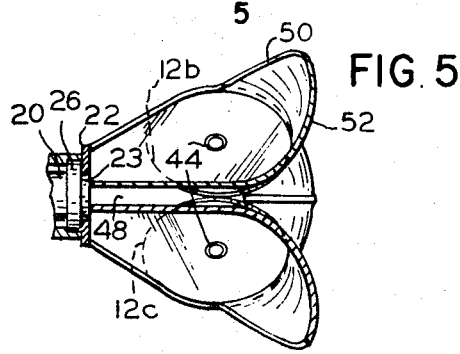
FIG. 5 is a vertical sectional view taken along the line 5—5 of FIG. 2.
Figure 4:
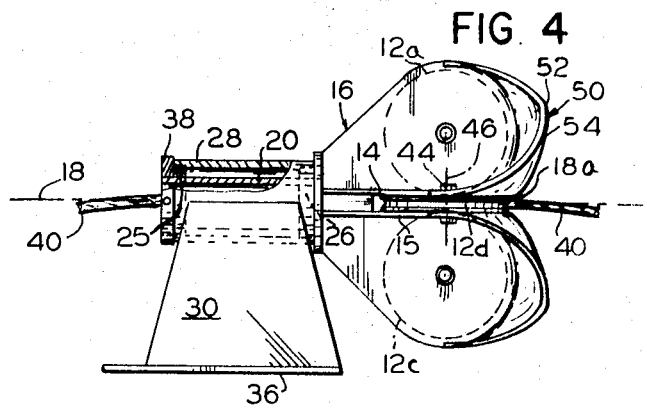
FIG. 4 is a side elevational view of the fairlead assembly of FIG. 1 with the forward portion of the assembly being rotated through 45° and with a portion of the assembly broken away for clarity of illustration.

With reference to the drawings, FIGS. 1 through 4 disclose a fairlead assembly 10 including four sheaves 12a, 12b, 12c, 12d mounted for rotation about their respective axes between a pair of side plates 14, 15 of a sheave mounting means 16. Sheave mount 16 is mounted for revolving movement about an extension 18a of the longitudinal axis 18 of a cylindrical guide sleeve 20. To this end sheave mount 16 is fixed to an annular ring member 22 which in turn is fixed to the forward end 23 of sleeve 20 as shown in FIG. 5.

Sleeve 20 is rotatably mounted within a cylindrical outer casing 28 by a pair of bearing members 25, 26 at opposite ends of the sleeve. For a long bearing life, sleeve bearings 25 and 26 are preferably Timken roller bearings. However, sleeve bearings or other suitable bearings could also be used. A locking collar 38 fixed to the rear end of sleeve 20 retains the sleeve longitudinally within casing 28.

Casing 28 is fixed to opposite side plates 30, 32 of a fairlead mount 34 which includes a horizontal base plate 36. The base plate may be bolted or otherwise attached to, for example, a loading dock. However, it is to be understood that the fairlead assembly may be operated in any desired orientation such as at the end of a vertical or inclined boom.

Figure 3:
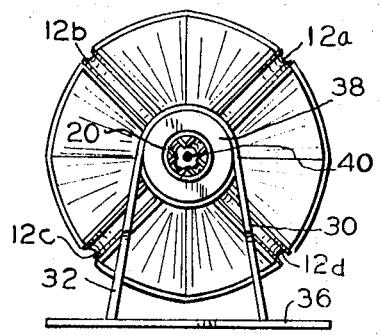
FIG. 3 is a rear end view of the fairlead assembly of FIG. 1.

As shown best in FIG. 3, guide sleeve 20 defines a longitudinal opening through which a load-handling cable 40 extends from, typically for example, a yarder or power-driven winch drum (not shown).

The four sheaves 12a, 12b, 12c, 12d are of a type of relatively large diameter and narrow width. The periphery of each sheave wheel defines an annular groove 42 within which a cable is adapted to ride. The four sheaves are symmetrically arranged about the projection 18a of longitudinal axis 18 of sleeve 20 and radiate outwardly from such axis as shown best in FIG. 2. Each of the four sheaves is mounted between one of the four sets of side plates 14, 15 on a pin 44 mounted in a roller or other suitable bearing (not shown) for rotation about an axis 46 which extends in a direction normal to the axis 18 of the guide sleeve.

Figure 6:
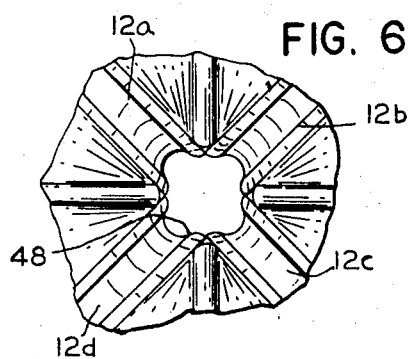
FIG. 6 is an enlarged view of a central portion of the front of the fairlead assembly as shown in FIG. 2.

As shown most clearly in FIG. 6, the four sheaves converge inwardly toward the center of the front face of the sheave mount 16 and terminate at their radially inner peripheries closely adjacent one another so as to define together a relatively small cable opening 48. This opening defines a forward extension of the opening through sleeve 20 and is the opening through which the cable 40 leads toward the load.

Figure 7:
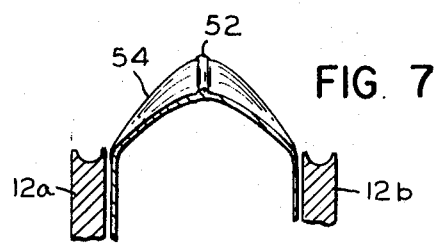
FIG. 7 is a sectional view taken along the line 7—7 of FIG. 2.

The forward portion of sheave mount 16 includes four crowned line guide plates 50 which extend across the spaces between adjacent pairs of the four sheaves 12 and are attached to side plates 14, 15. Each crowned line guide 50 has a convexly curved outer line-engaging guide surface 54 which slopes downwardly in opposite directions from a high central ridge 52 toward the adjacent sheaves. Each ridge 52 bisects the included angle between the adjacent pair of sheaves and lies at a level forwardly or outwardly of the outer peripheries of the adjacent sheaves as will be clear from FIG. 4. The outer guide surface 54 slopes rearwardly or inwardly as viewed in FIG. 4 from such ridge and terminates at the outer peripheries of said sheaves as shown best in FIG. 7.

It will thus be apparent that should cable 40 extend under load offlead across one of guide surfaces 54, such surface will tend to force the line toward the closest one of the adjacent sheaves because of the slope of such surface. It will also be apparent that the line 40 under such circumstances will tend to revolve the entire sheave mount 16 and sleeve 20 until the cable 40 becomes aligned with the closest adjacent sheave because of the leverage or torque exerted by the line against the sloping surface 54. Therefore regardless of the direction in which cable 40 leads from the fairlead assembly toward a load, the cable will be quickly guided into one of the sheaves through the guiding and torque-inducing action of crowned guide surfaces 54.

As shown in FIG. 5, ridge 52 slopes in a radial direction inwardly from the outer periphery of its line guide 50 and terminates at the opening 48 defined by the four sheaves 12.

Figure 1:
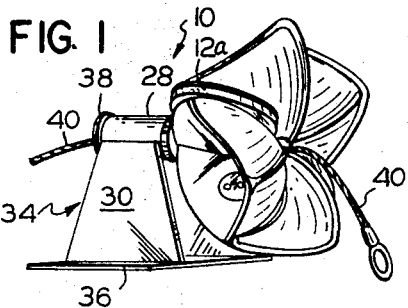
FIG. 1 is a front and side perspective view of a fairlead assembly in accordance with the invention.

Although the construction and operation of the invention has been described with respect to the four-sheave fairlead of FIG. 1, it will be apparent that the principles of the invention can also be applied to any multiple sheave fairlead.

Figures 8, 9:
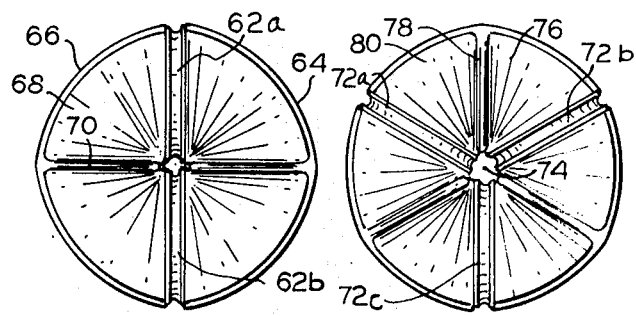
FIGS. 8 and 9 are front views of modifications of the fairlead assembly showing respectively a two-sheave and a three-sheave fairlead.
Figure 2:
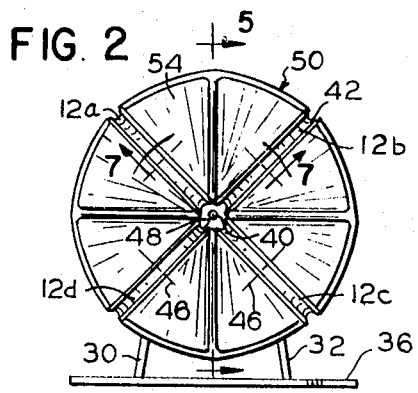
FIG. 2 is a front end view of the fairlead assembly of FIG. 1 on a slightly enlarged scale.

For example, in FIG. 8 a fairlead in accordance with the invention is shown with two sheaves 62a, 62b spaced 180° apart. Convexly curved line guide plates 64, 66 extend between the sheaves and have convexly curved guide surfaces 68. These surfaces curve inwardly from an outer central ridge 70 toward the peripheries of the sheaves.

Similarly, in FIG. 9 a fairlead assembly in accordance with the invention includes three sheaves 72a, 72b, 72c symmetrically arranged about a central opening 74 defined by such sheaves. The sheaves are separated by three crowned line guide plates 76. Each plate has a high central ridge 78 from which a convex guide surface 80 curves convexly toward the outer peripheries of the adjacent sheaves.

Although the principles of our invention have been described with respect to three specific illustrated embodiments, it should be apparent that such embodiments permit of modification in arrangement and detail. It is our intention not to be limited by the illustrated embodiments but to include within the scope of our invention such modifications and all equivalent constructions.

We claim:

1. A fairlead assembly comprising:
    guide sleeve means mounted for guiding a cable means therethrough,
    a plurality of guide sheaves,
    sheave mounting means connected to said sleeve means for revolving movement about the longitudinal axis of said sleeve,
    said sheave mounting means rotatably mounting said plurality of sheaves about a projection of the longitudinal axis of said sleeve means in a manner such that the axes of rotation of said sheaves extend in directions normal to the longitudinal axis of said sleeve means and such that said sheaves define a central cable opening,
    shield-like line guide means supported by said sheave mounting means and extending between each adjacent pair of said sheaves so as to be divided by said sheaves into equal segments,
    each said guide segment including an outwardly and forwardly facing convexly curved line-engaging surface sloping in opposite directions from a high ridge bisecting the included angle between adjacent sheaves and positioned outwardly of the outer peripheries of adjacent sheaves inwardly to a first pair of curved edges bordering toward said outer peripheries throughout the extent of said edges and also radiating from said central cable openings to a second pair of edges extending from the outer terminus of said ridge in opposite directions to intersect said first pair of edges in a manner so that said guide sheaves and said guide segments together define a 360° bearing surface and such that engagement of a cable means with said line-engaging surface with said cable means under load tends to revolve said sheave mounting means until said cable means is aligned with one of said sheaves in both a forward lead and a rearward lead from said cable opening.

2. A fairlead assembly according to claim 1 wherein said plurality of sheaves are symmetrically arranged about the projection of the longitudinal axis of said sleeve means.

3. A fairlead assembly according to claim 1 wherein said sleeve means is mounted for rotation about its longitudinal axis and said sheave mounting means is rigidly connected to an end portion of said sleeve means for rotation with said sleeve means.

4. A fairlead assembly according to claim 2 wherein said plurality of sheaves includes at least two sheaves.

5. A fairlead assembly according to claim 2 wherein said plurality of sheaves includes at least three sheaves.

6. A fairlead assembly according to claim 2 wherein said plurality of sheaves includes at least four sheaves.

7. A fairlead assembly according to claim 1 wherein said sheaves converge inwardly toward one another closely adjacent a projection of the longitudinal axis of said sleeve means to define together a small cable guide opening forming a continuation of a guide opening through said sleeve means.

8. A fairlead assembly according to claim 1 wherein said sleeve means is rotatably mounted within a stationarily mounted outer casing, said sheave mounting means being rigidly connected to one end of said sleeve means, and bearing means at opposite ends of said sleeve means rotatably supporting said sleeve means within said casing.

9. A fairlead assembly comprising:
    tubular guide sleeve means for guiding a cable therethrough,
    a plurality of guide sheaves,
    sheave mounting means mounting said sheaves forwardly of said guide sleeve means and symmetrically about a forward projection of the axis of said sleeve means in converging relationship to define a cable opening therebetween coaxial with said forward projection,
    said sheave mounting means mounting said sheaves for revolving movement together about said forward projection and individually about their own respective rotational axes,
    and curved shield-like cable guide segments extending between the forwardmost peripheries of each adjacent pair of said sheaves and having an outwardly and forwardly directed convexly curved bearing surface providing together with said sheaves a 360° cable bearing surface, said bearing surface of each segment curving radially from said cable opening between sheaves first forward and then rearwardly with respect to said opening so as to present a curved bearing surface to a cable extending from said opening in both a forward and a rearward lead therefrom.

References Cited
UNITED STATES PATENTS
3,006,608  10/1961  Cimino _____ 254—190

HARVEY C. HORNSBY, Primary Examiner